United States Patent
Jeansonne et al.

(10) Patent No.: US 6,691,049 B1
(45) Date of Patent: Feb. 10, 2004

(54) METHOD AND APPARATUS TO DETECT THAT THE BATTERY GAUGE IS OUT OF CALIBRATION

(75) Inventors: Jeffrey K. Jeansonne, Houston, TX (US); Duane J. Gatlin, Tomball, TX (US); Robert C. Hurbanis, Jr., Tomball, TX (US); James L. Mondshine, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/537,837

(22) Filed: Mar. 29, 2000

(51) Int. Cl.$^7$ ................................................. G06F 19/00
(52) U.S. Cl. ............................. 702/63; 702/63; 702/85; 702/108; 702/189; 324/426; 324/430; 324/433; 320/137; 320/134; 320/136; 320/144; 700/297
(58) Field of Search ............................... 702/57, 60–65, 702/81, 82, 85, 89, 108, 116, 127, 133, 189, FOR 103–106, 134, 135, 142, 164, 170, 171; 324/73; 700/297, 286, 90

(56) References Cited

U.S. PATENT DOCUMENTS

| | | | |
|---|---|---|---|
| 4,716,354 A | * 12/1987 | Hacker | 320/114 |
| 5,606,242 A | * 2/1997 | Hull et al. | 320/48 |
| 5,705,929 A | * 1/1998 | Caravello et al. | 324/430 |
| 5,751,134 A | * 5/1998 | Hoerner et al. | 320/124 |
| 6,252,511 B1 | * 6/2001 | Mondshine et al. | 340/636 |

* cited by examiner

Primary Examiner—Marc S. Hoff
Assistant Examiner—Elias Desta

(57) ABSTRACT

A laptop computer system comprising an apparatus and related method for monitoring a battery gauge of a laptop computer and notifying the computer system user if the battery gauge is out of calibration by monitoring a calculated remaining battery capacity value in relation to a system battery charging or discharging such that if the calculated remaining battery capacity does not properly indicate a remaining charge capacity at either of a charge cycle of a system battery or discharge cycle of the system battery. If the battery gauge is out of calibration, a unique scan code identifying that a battery gauge calibration needs to be run is generated which triggers some form of user notification.

28 Claims, 4 Drawing Sheets

METHOD AND APPARATUS TO DETECT THAT THE BATTERY GAUGE IS OUT OF CALIBRATION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to portable computers and particularly to battery operated portable computers. More particularly, the present invention relates to portable computers that detect when a battery gauge is out of calibration.

BACKGROUND OF THE INVENTION

Effective battery design has been at the forefront of computer system development in recent years. Batteries store an electric charge, which is gradually released to power the computer circuitry. Laptop computers in particular are designed to operate on battery power, allowing the computer to be used in virtually any location. One drawback to running a computer on battery power is that the user is limited to a finite number of hours of computing time before the battery capacity is depleted. Thus, maximizing battery life is desirable. The exact amount of operating time that a battery provides depends on a number of factors, including the charge storage capacity of the battery, the operating speed of the computer, and the number of transistors in the computer. Higher operating speeds and more transistors, which generally permit higher performance, generally draw more power. Thus, power requirements continue to increase as computer manufacturers strive to improve performance, increasing the demand for higher battery capacity.

Manufacturers have employed a variety of techniques to extend battery operating time, including modifications to computer hardware, special power-saving software algorithms, and improvements in battery technology. Many computer components, especially in laptop computers, are designed to shut down after a period of inactivity, even while the rest of the computer continues to operate. The display screen, for example, may darken or turn off if the user fails to type on the keyboard or move the mouse after a predetermined period of time. Similarly, the disk drive may shut off if not accessed for a period of time. Many computer systems are capable of entering a special "sleep" mode in which virtually the entire computer shuts down, including the central processing unit (CPU), although the memory contents are retained so that the computer can return to normal operation within a few seconds. Older computers relied on instructions stored in the computer hardware known as the Advanced Power Management (APM) to determine when to shut down selected components. Newer computer designs which conform to the Advanced Configuration and Power Interface (ACPI) standard, developed by Intel, Microsoft, and Toshiba, rely on the operating system (e.g., Windows 98) software to turn individual components on and off. Power control, through either hardware or software, extends the battery life by drawing power only as needed.

Recent improvements in battery design have extended battery life, as well. Previously, battery voltage would decrease as the charge drained, eventually dropping off very quickly as the capacity neared zero. Although some electric charge would remain, these batteries could not regain the required operating voltage without being recharged. Newer batteries, by contrast, tend to have a more linear discharge curve. When the battery output voltage drops below the desired operating voltage, modem computers typically have about four to eight seconds of operation time left before no power remains, terminating computer operation. Thus, modem batteries last longer by operating more efficiently.

In order to prevent the computer from suddenly shutting down due to a drained battery, possibly resulting in data loss, computer software continuously tracks the battery level and notifies the user of the remaining battery power. Some computers, upon nearing complete discharge, prevent data loss by automatically saving the memory contents to disk and then shutting the computer down. The user then must recharge the battery, insert another computer battery, or plug the computer into a wall socket to resume computing.

Accordingly, it is desirable to know how much battery charge remains when operating on battery power. Typically, the amount of remaining charge is determined by continuously measuring battery output current, beginning after the battery is recharged. Because the exact capacity of charge a battery can store is affected by many parameters, include age, temperature, etc., the battery monitor assumes the battery charged to a "last known capacity" of the battery pack. The remaining battery level then is determined by subtracting the spent charge from the last known battery capacity.

Because of the nature of battery chemistry, however, accurately determining the amount of charge stored in the battery after recharging can prove difficult. Some rechargeable batteries exhibit a phenomenon known as the "memory effect," in which the battery cannot charge to full capacity unless first being completely discharged. If a battery is discharged to 90% of its initial charge level and then recharged, for example, then recharging the battery will not succeed in filling the battery to 100% of its charge capacity. Instead, the battery will stop recharging before reaching full capacity. Repeated charge/discharge cycles enhance the memory effect, causing the battery to reach successively lower levels of charge after each recharge. Whenever the memory effect prevents the battery from charging to capacity, the battery gauge reflects a higher level of charge than the battery actually stores because the calculated value is based on the last known battery capacity. The memory effect thus can reduce the accuracy of a battery gauge by increasing the difference between the last known battery capacity and the actual charge level after recharging. Accordingly, the battery gauge may indicate that there is charge remaining when the battery reaches complete discharge. Also, the last known capacity cannot account for temperature variations, load conditions or self discharging of the battery.

To compensate for the battery gauge inaccuracy, the computer systems in the past have saved memory shut down when the charge level falls below a predetermined cutoff point. The cutoff point, which typically represents a percentage of the total battery capacity, is set sufficiently high to prevent unexpected loss of power. Though effective in preventing unexpected shut down, this early shut down technique reduces the amount of operating time for the user. In addition, because the battery never reaches complete discharge, the memory effect, if any, circumvents accurate measurement of the charge level by preventing the battery from fully recharging again.

For the foregoing reasons, it would be desirable to have a computer system capable of monitoring battery gauge calibration and alerting the user that a battery calibration is required. Such a computer system would greatly enhance computer functionality.

SUMMARY OF THE INVENTION

Accordingly, the present invention discloses a computer system with a rechargeable battery which is capable of monitoring the calculated capacity calibration of the battery gauge to determine whether the calibration corresponds to the actual battery capacity. More specifically, the computer system monitors a battery capacity register in battery logic associated with the system battery when the battery is nearing a full charge, and when the battery is on the verge of being depleted. During a charge cycle of the battery, the computer system monitors the battery capacity register. If the battery capacity register reaches a maximum capacity indication more than ten minutes before the battery actually reaches a valid charge termination, this indicates the battery capacity register is out of calibration. A valid charge termination is determined by a keyboard controller monitoring system battery voltage for a drop in overall voltage which characteristically indicates that the battery capacity has been charged to a maximum amount. Likewise, if the system battery reaches a valid charge termination and the battery capacity register shows less than ninety percent charge capacity, the battery gauge is too far out of calibration. During computer system operation on the system battery, the keyboard controller monitors the battery capacity register in relation to the low battery signal. If the battery capacity register reaches a zero percent indication more than ten minutes before assertion of the depleted battery signal, the battery capacity register is too far out of calibration or depleted. Likewise, if the battery capacity register indicates ten percent indication when the low or depleted battery signal is asserted by the keyboard controller, the battery capacity register is too far out of calibration.

In all of these instances where the battery register exceeds calibration tolerance, the keyboard controller notifies system software so that the bezel software can notify the user to run a battery system calibration. This notification comprises sending a unique scan code, much like the scan codes sent when a user presses a key on the keyboard. Upon receiving this scan code that uniquely identifies that the battery capacity register is out of calibration, the system software notifies the user in some appropriate way.

Thus, the present invention comprises a combination of features and advantages that enable it to substantially advance the art by providing a computer system capable of determining when the battery gauge is out of calibration and informing the user of such an error thus enabling the user to perform a battery system calibration. These and various other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
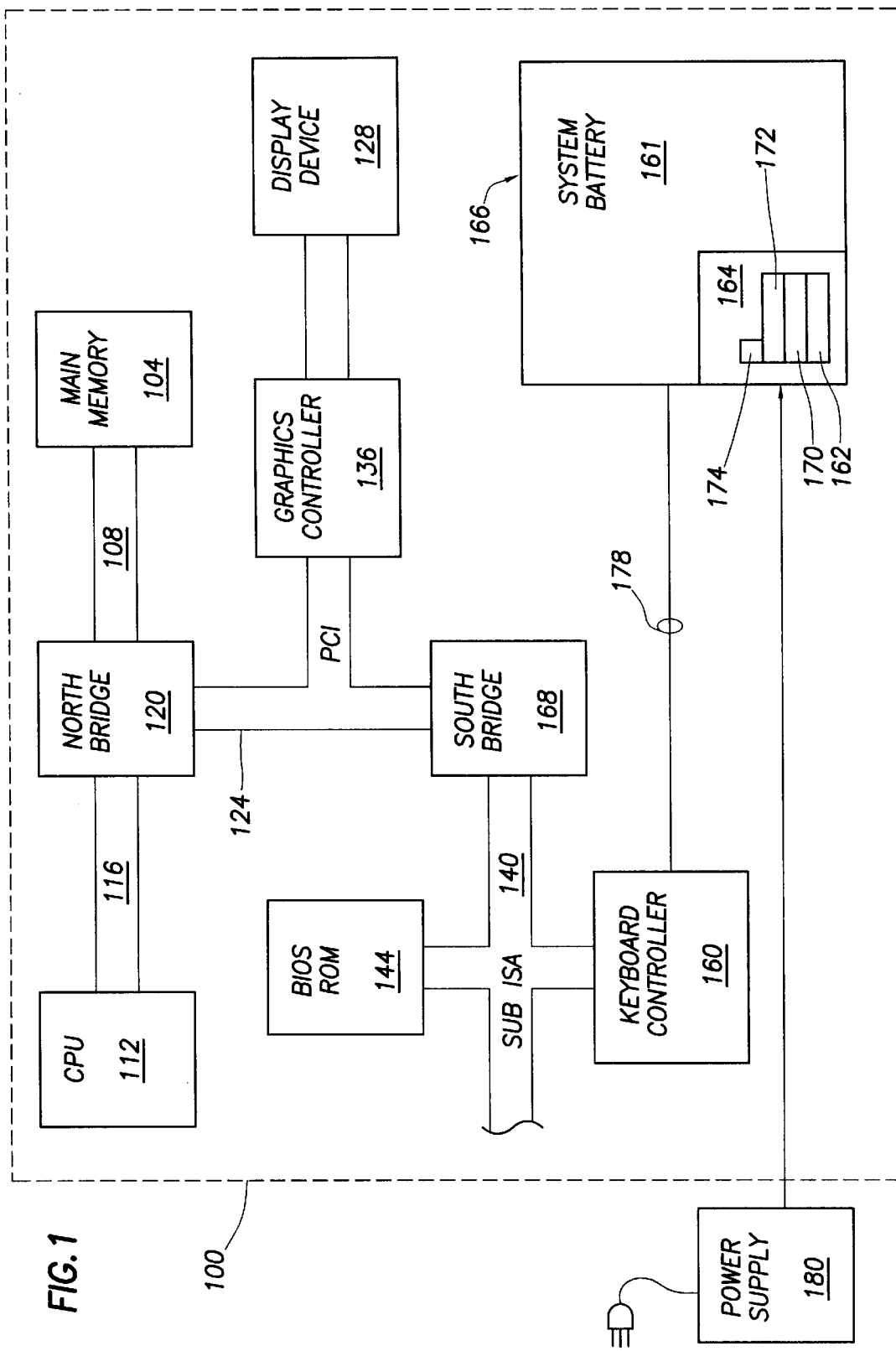
FIG. 1 illustrates a computer system constructed in accordance with the preferred embodiment.

FIG. 1 illustrates a laptop computer system 100 constructed in accordance with the preferred embodiment. The following discussion, however, should not be construed as limiting the present invention to a laptop. The present invention also may be used with a desktop system, work station, server, handheld computer, or any other battery operated electronic computing device, such as a cellular telephone. Computer system 100 generally comprises a microprocessor or CPU 112 coupled to a main memory array 104 and a variety of other peripheral computer system components through an integrated North bridge logic device 120. The bridge logic device 120 is sometimes referred to as a "North bridge" for no other reason than it often is depicted at the upper end of a computer system drawing. The CPU 112 preferably couples to bridge logic 120 via a CPU local bus 116, or the bridge logic 120 may be integrated into the CPU 112. The CPU 112 may comprise, for example, a Pentium® III microprocessor. It should be understood, however, that computer system 100 could include other alternative types of microprocessors. Further, an embodiment of computer system 100 may include multiple processors, with each processor coupled through the CPU bus 116 to the bridge logic unit 120. In addition, other architectures could be used if desired. Thus, the computer system may implement other bus configurations and bus bridges in addition to, or in place of, those shown in FIG. 1.

The main memory array 104 preferably couples to the bridge logic unit 120 through a memory bus 108, and the bridge logic 120 preferably includes a memory control unit (not shown) that controls transactions to the main memory 104 by asserting the necessary control signals during memory accesses. The main memory 104 functions as the working memory for the CPU 112 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The computer system 100 also preferably includes a graphics controller 136 that couples to the bridge logic 120 via an expansion bus 124. As shown in FIG. 1, the expansion bus 124 comprises a Peripheral Component Interconnect (PCI) bus. Alternatively, the graphics controller 136 may couple to bridge logic 120 through an additional Advanced Graphics Port (AGP) bus (not specifically shown). As one skilled in the art will understand, the graphics controller 136 controls the rendering of text and images on a display device 128. The graphics controller 136 may embody a typical graphics accelerator generally known in the art to render three-dimensional data structures on display 128. These data structures can be effectively shifted into and out of main memory 104 via the expansion bus and bridge logic 120. If an AGP bus is included in the system, the bridge logic 120 also includes an interface for initiating and receiving cycles to and from components on the AGP bus. The display 128 comprises any suitable electronic display device upon which an image or text can be represented. A suitable display device may include, for example, a cathode ray tube (CRT), a liquid crystal display (LCD), a thin film transistor (TFT), a virtual retinal display (VRD), or any other type of suitable display device for a computer system.

In the preferred embodiment as shown in FIG. 1, the primary expansion bus 124 comprises a Peripheral Component Interconnect (PCI) bus. Computer system 100, however, is not limited to any particular type of expansion bus, and thus various buses may be used, including a high speed (66 MHz or faster) PCI bus. In the preferred embodiment, any number of PCI peripheral devices may reside on the PCI bus 124, including devices such as, for example, network interface cards (NIC's), video accelerators, audio cards, hard or floppy disk drives, Personal Computer Memory Card International Association (PCMCIA) drives, Small Computer Systems Interface (SCSI) adapters and telephony cards.

In addition, and as mentioned above, computer system 100 can be implemented with respect to the particular bus architectures shown in FIG. 1 (i.e., PCI bus), or other bus architectures, as desired. Further, because CPU 112 preferably comprises a Pentium® III processor, the CPU local bus 116 represents a Pentium® III bus. These bus protocols and the termninology used with respect to these protocols are well known to those of ordinary skill in the art. For a more thorough understanding of the PCI bus, refer to the *PCI Local Bus Specification* (1993). If an AGP bus also is used in the computer system, reference may be made to the *Accelerated Graphics Port Interface Specification* (Intel, 1996).

Referring still to FIG. 1, a secondary bridge logic device 168 preferably connects to the primary expansion bus 124. The secondary bridge logic 168 is sometimes referred to as a "South bridge," reflecting its location vis-a-vis the North bridge in a typical computer system drawing. The South bridge 168 couples or "bridges" the primary expansion bus 124 to other secondary expansion buses. These other secondary expansion buses may include an ISA (Industry Standard Architecture) bus, a sub-ISA bus, a USB (Universal Serial Bus), an IDE bus, an IEEE 1394 standard (or "FireWire") bus, or any of a variety of other buses that are available or may become, available in the future. In the preferred embodiment of FIG. 1, the South bridge logic 168 couples to a sub-ISA bus 140. Thus, as shown in the preferred embodiment of FIG. 1, a keyboard controller logic 160 connects to the sub-ISA bus 140, as does a BIOS ROM 144.

The keyboard controller 160 preferably interfaces various input devices, including a mouse (not shown), a keyboard (not shown), a floppy disk drive (not shown), and the battery device 166. The keyboard controller 160 typically comprises an ISA bus interface (not specifically shown) and transmit and receive registers (not specifically shown) for exchanging data with the South bridge 168. The keyboard controller 160 could comprise, for example, a Hitachi H83434.

As shown in FIG. 1, battery device 166 comprises system battery 161 and battery logic 164. The battery device 166 couples to the keyboard controller 160 via an Inter Integrated Circuit (I²C) bus 178. Optionally, the South bridge 168 may couple to the I²C bus as well. The I²C bus is a dual line, multidrop serial bus developed by Philips Semiconductors that comprises a clock line and one data line. The devices connected to the I²C bus can act as either master or slave devices, and each device is software addressable by a unique address. Master devices can operate as transmitters, receivers, or combination transmitter/receivers to initiate 8-bit data transfers between devices on the bus. The I²C utilizes collision detection and arbitration to prevent data corruption if two or more masters simultaneously transfer data. In the preferred embodiment, the keyboard controller 160 acts as sole master of the I²C bus to initiate data transfers. The South bridge 168 and/or battery device 166 may act as bus masters if desired. The South bridge logic 168 and/or battery 166 preferably are capable of holding the bus data signal low for a period of time, to alert the keyboard controller 160 to changes in operating conditions.

The system battery 161 preferably comprises a lithium ion (LiIon) rechargeable storage cell but alternatively can be any desired rechargeable battery, such as a nickel metal hydride (NiMH) type. In the charging mode, the battery 161 receives current from the system power supply 180 (FIG. 1), which replenishes the charge storage cell. The system power supply 180 preferably is separate from the computer system 100. The battery preferably exits the charging mode when the storage cell is fully charged, to prevent damage from overcharging. In the discharging mode, the system battery 161 supplies current to the computer.

The battery device 166 preferably includes a battery logic 164 which preferably comprises a microprocessor or controller for controlling battery operation, along with associated logic circuitry such as an electrically erasable programmable read only memory (EEPROM) and an I²C interface, for example. Various registers which indicate operating modes and characteristics of the battery, either in the microprocessor or in associated logic circuitry, preferably include a battery capacity register 162, a battery voltage register 170, a cell temperature register 172, and a low battery signal register 174. The battery capacity register 162 indicates a calculated amount of charge stored in the battery, measured as a percentage of the total capacity, and the battery full register (not shown) is set if the percent charge is at 100%. The battery voltage register indicates the voltage levels existing on the battery terminals. The register values generally may be read or written via the I²C bus. Note that these registers merely represent one possible configuration of registers. Additional register configurations are possible, as well.

In the preferred embodiment, and in accordance with normal battery convention, the keyboard controller 160 asserts a low battery signal to the low battery signal register 174 when the storage cell is nearly discharged. The low battery signal register 174 preferably includes a dedicated bit that represents when the battery voltage is low, as indicated by the low battery signal from the keyboard controller 160. In a typical LiIon battery, for instance, the battery logic 164 asserts the low or depleted battery signal when approximately 4 seconds of operating time remain in the battery. Note that 4 seconds only represents a time estimate, however, and the keyboard controller 160 may assert the low battery signal a number of seconds sooner or later than 4 seconds before total discharge. Additionally, other time periods may be used to determine when to assert the low battery signal. Preferably, the battery will supply sufficient current to operate the computer even after asserting the low battery signal, but only for a short time. There may be other battery signals in registers of the keyboard controller 160. For example, a low battery signal identifying when approximately five minutes remain of battery capacity which may be set by the keyboard controller 160.

Because a computer system user may not be able to completely discharge the system battery before each charging operation, battery capacity register calibration may suffer due to the memory effect of the system battery. Likewise, as batteries age, their charge capacity changes, further compounding the problem of maintaining correct calibration of the battery capacity register. To address this problem, modifications preferably are made to the keyboard controller 160 and any host software in the computer system. Specifically, the keyboard controller 160 is modified to monitor the value stored in the battery capacity register 162, and, based on whether there has been a valid charge termination of the battery and/or assertion of the low battery signal, the keyboard controller 160 determines whether the battery capacity register 162 is properly calibrated to the actual battery capacity.

Figure 4:
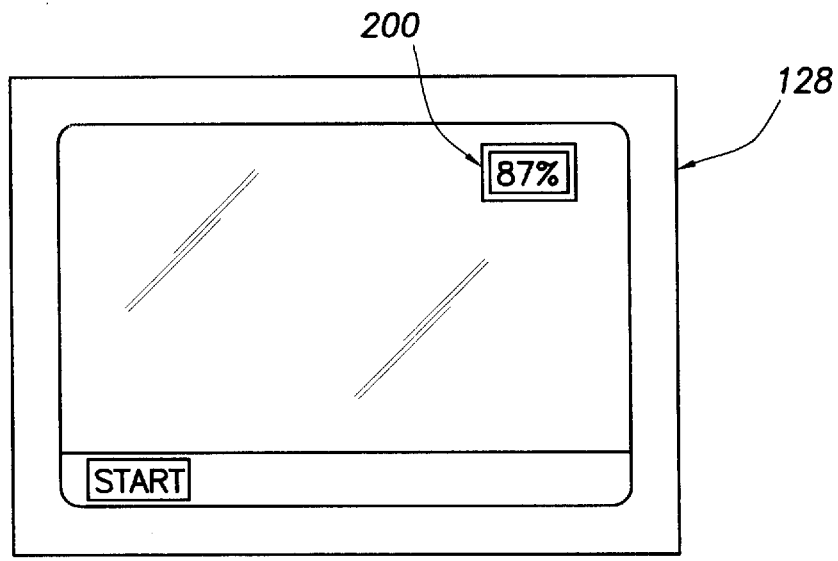
FIG. 4 shows an exemplary graphic shown on a display device indicating remaining battery capacity.

Referring still to FIG. 1, the battery capacity register 162, battery voltage register 170, cell temperature register 172 and low battery signal register 174 are all preferably contained in the battery logic 164 within the battery device 166. Battery logic 164 monitors battery current flow and calculates a battery capacity register value that indicates calculated remaining battery capacity to be placed in the battery capacity register 162. As mentioned above, the remaining battery capacity is calculated by measuring current flow and subtracting the amount of power provided from the full charge capacity of the battery. Likewise, battery logic 164 monitors the voltage on the system battery 161 and places a value in the battery voltage register 170 representing the battery cell voltage. Battery logic 164 further monitors the battery temperature and places a value corresponding to that temperature in the cell temperature register 172. Finally, by triggering off the value in the battery capacity register 162, the keyboard controller 160 asserts the low battery signal register 174 when only a few seconds of battery power remain. When a user sees an indication on the display device 128 either giving a numerical value of percentage capacity remaining in the battery or possibly some form of bar graph, the information displayed on the display device 128 preferably directly corresponds to the calculated battery capacity stored in the battery capacity register 162. FIG. 4 shows an exemplary user interface battery gauge 200 on a display device 128. One of ordinary skill in the art will realize the user interface battery gauge 200 could take many forms, including a bar graph, a pie graph or areas of changing color indicating battery capacity.

The keyboard controller 160 preferable communicates with the battery logic 164 over the I$^2$communication bus 178. Over this bus 178, the keyboard controller reads and writes the values from the various registers, including writing the status of the low battery signal register 174. The keyboard controller 160 processes the values read from the registers and determines whether the value calculated and stored in the battery capacity register 162 is an accurate representation of the actual battery capacity.

The determination of whether the battery capacity register 162 contains a value that is calibrated to, or otherwise closely correspond to, the actual battery capacity can be broken into two related processes. The first process is monitoring the battery capacity register value 162 when the system battery 161 is charging. The second process is monitoring the battery capacity register value 162 the system battery is on the verge of depleting its charge capacity.

Figure 2:
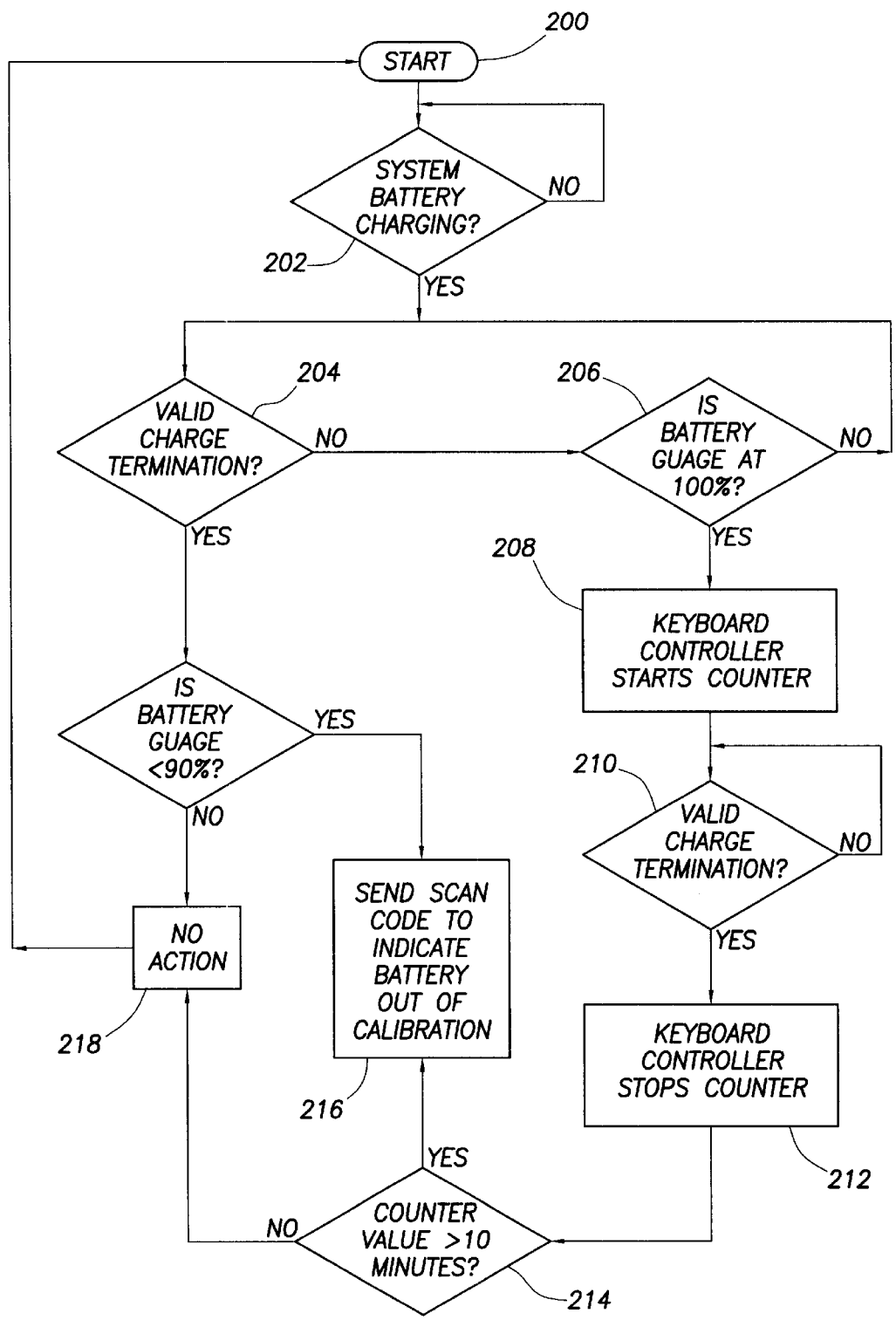
FIG. 2 shows a flow chart for determining whether the battery gauge is calibrated during a charge cycle.

FIG. 2 shows an exemplary flow chart of the steps involved in determining whether the battery capacity register value is calibrated to the actual battery capacity during a battery charge cycle. The keyboard controller 160 preferably implements the analysis of the flow diagram of FIG. 2. The analysis starts at block 200 and proceeds to block 202 in which the keyboard controller 160 determines if it has requested that the system battery 161 be placed in a charge mode. If the keyboard controller has not requested that the system battery 161 be placed in a charge mode, the analysis ends at block 202. However, if the keyboard controller 160 has requested that the system battery be placed in a charge mode, the analysis moves to the determination at block 204. At block 204, the keyboard controller 160 decides whether or not, in the process of charging the system battery 161, a valid charge termination has occurred. A valid charge termination occurs when the keyboard controller 160, monitoring various parameters associated with the system battery 161, determines that the system battery 161 has absorbed all the charge possible given its design. The keyboard controller 160 may make this determination by monitoring the value in the battery voltage register 170, or preferably the keyboard controller 160 monitors the battery voltage itself, through an analog-to-digital converter.

Figure 5:
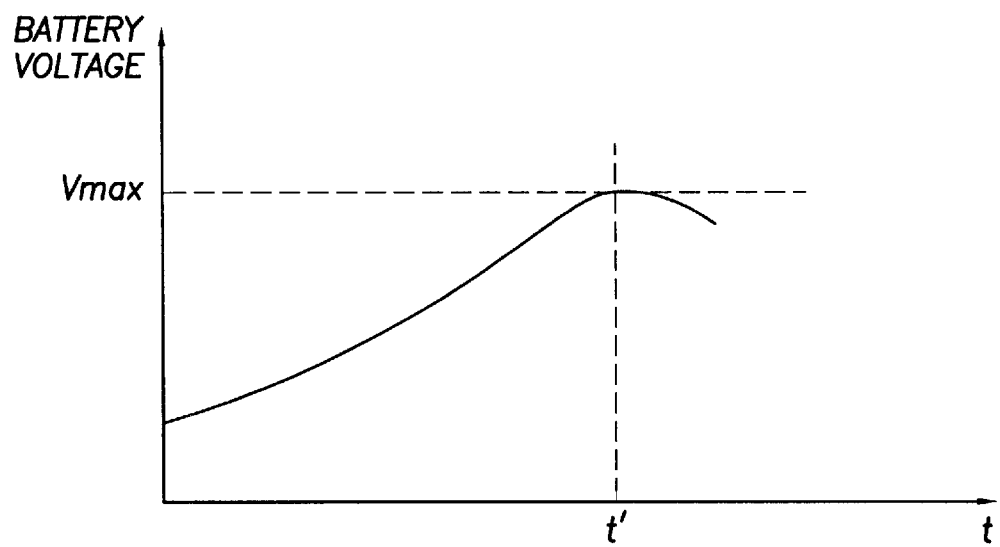
FIG. 5 shows an exemplary graph of battery voltage plotted against time during a battery charge cycle.

Characteristic of most batteries used to supply power to laptop computing devices, as the battery's stored capacity reaches a maximum, the battery voltage at its output terminals drops slightly from a maximum value. FIG. 5 shows an exemplary plot of battery voltage with respect to time during a charge cycle. The keyboard controller 160, by monitoring the battery voltage, can determine when the system battery is fully charged. When the drop in voltage occurs starting at time t' associated with a charging procedure, this drop in battery voltage indicates a valid charge termination. Additionally, the keyboard controller 160 monitors the value in the cell temperature register as well as keeping track of how long the system battery 161 has been in a charge mode. If the system battery 161 has been charging for too long or the cell temperature value starts to rapidly rise, the charge of the system battery 161 is terminated and no valid charge termination has occurred.

Referring still to FIG. 2 at block 204, when there has not been a valid charge termination the procedure moves to block 206. In block 206 the keyboard controller 160 determines whether or not the battery gauge, that is the battery capacity register value, indicates a maximum charge capacity. If the battery capacity register value does not indicate a maximum charge capacity, the procedure preferably steps back to decision block 204. However, if the battery capacity register value, as stored in the battery capacity register 162, indicates a maximum, the keyboard controller 160 starts a counter at block 208 and then waits for a valid charge termination in block 210. Upon receiving a valid charge termination, the keyboard controller 160 stops the counter at block 212 and proceeds to block 214 where it determines whether the counter ran for more or less than ten minutes. The counter running for more than ten minutes indicates that the battery capacity register value showed maximum battery capacity more than ten minutes before a valid charge termination occurred (and therefore, the battery capacity register value is out of calibration). If the delay was more than ten minutes, the keyboard controller 160 preferably sends a scan code to system software to indicate that the battery is out of calibration in block 216. By contrast, if the keyboard controller 160 determines, in block 214, that the battery gauge value reached a maximum indication within ten minutes of a valid charge termination, the keyboard controller 160 takes no action, block 218. Thus, in summary, the keyboard controller 160 monitors the value of the battery capacity register 162 in relation to a valid charge termination. If the battery capacity register value reaches a maximum indication more than ten minutes before a valid charge termination, this is an indication that the battery gauge needs to be calibrated.

Referring still to FIG. 2, if a valid charge termination is indicated in block 204, the process proceeds to block 220 where the keyboard controller 160 determines whether or not the value in the battery capacity register 162 indicates less than ninety percent of full charge capacity. If this is the case, the keyboard controller proceeds to block 216 and preferably sends a scan code to the operating software to indicate that the battery gauge is out of calibration. If the decision at block 220 indicates that the battery gauge reads more than ninety percent charge capacity when a valid charge determination occurred, the keyboard controller steps to no action block 218. If this condition is met, but there is a discrepancy between the battery capacity register value and the assumed 100 percent capacity, these minor errors may be, and preferably are, corrected by setting the battery capacity register value to 100%. Thus, the keyboard controller 160 monitors the value in the battery capacity register and if that value indicates less than ninety percent charge capacity when a valid charge termination occurs, the keyboard controller determines that the battery gauge is out of calibration and takes necessary steps to inform the computer user that a battery calibration needs to occur.

Figure 3:
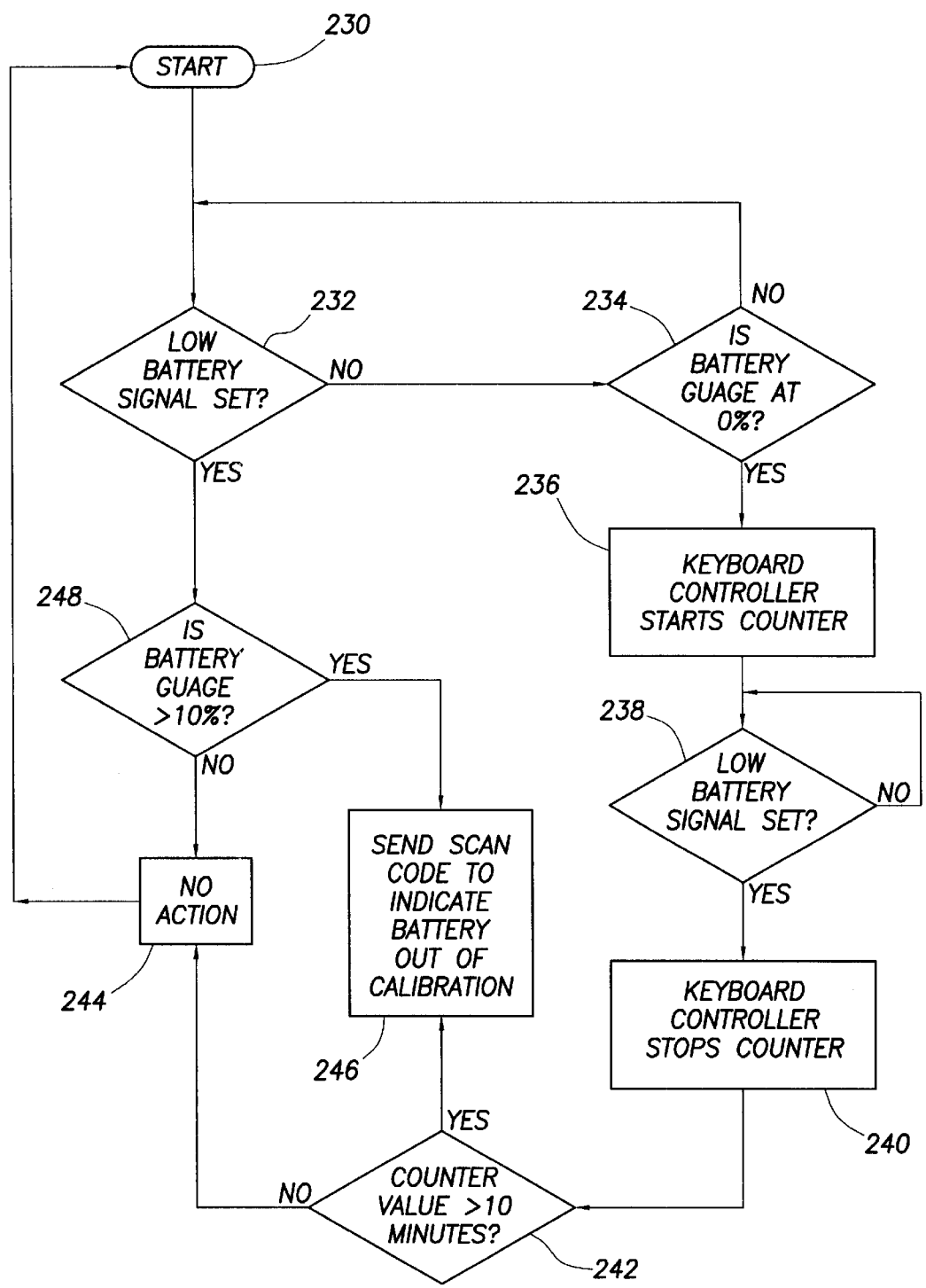
FIG. 3 shows a flow chart for determining when the battery gauge is calibrated during a battery discharge cycle.

Referring to FIG. 3, an exemplary flow diagram is shown of the decision tree that the keyboard controller 160 preferably follows to determine whether or not the battery gauge is in calibration when the computer system is being run from energy stored in the battery. The steps keyboard controller 160 goes through to determine whether or not the battery gauge is in calibration when the battery is in operation are similar to the steps as described with reference to FIG. 2. The trigger parameter of interest in FIG. 3 preferably is the low battery signal register value 174. The decision tree preferably starts at block 230 and advances to decision block 232. In decision block 232 the keyboard controller waits until it asserts the low battery signal. When the low battery signal is asserted, the keyboard controller steps to block 248 where the keyboard controller 160 preferably determines the value of the battery capacity register 162. If the battery capacity register 162 indicates more than ten percent charge capacity remaining when the low battery signal is asserted, this indicates that the battery gauge is out of calibration. If so, the keyboard controller sends a unique scan code in block 246 to indicate to the user that a battery calibration should be run. If the battery gauge value is less than 10%, the software takes no action (block 244). However, there may be some small discrepancy in the battery gauge reading. This small error is preferably corrected by forcing the battery gauge reading to 0%. Returning to block 232, if the low battery signal has not been asserted, the keyboard controller steps to block 234. If the battery capacity register value is at a minimum, block 234, the keyboard controller starts a counter in block 236 and increments to block 238 to wait until the low battery signal is asserted. Upon the low battery signal being asserted, the keyboard controller steps to block 240 where the counter, which was started in block 236, is stopped and the keyboard controller determines at block 242 whether the counter ran for more than ten minutes. Having the counter run for more than ten minutes indicates that the battery gauge showed minimum charge capacity remaining for more than ten minutes before the low battery signal was asserted and therefore keyboard controller sends a unique scan code in block 246 indicating that the battery gauge is out of calibration. If, however, the counter ran for less than ten minutes, this indicates the battery gauge showed a minimum charge capacity remaining for less than ten minutes before the assertion of the low battery signal and therefore the keyboard controller steps to block 244. Thus, the keyboard controller 160 monitors the value stored in the battery capacity register 162 in relation to the timing of the low battery signal 174. If the value in the battery capacity register 162 indicates a minimum charge capacity remaining ten minutes before assertion of the low battery signal, this is an indication that the battery gauge is out of calibration. Likewise, if the low battery signal is asserted and the battery gauge shows greater than ten percent charge capacity remaining, this too is an indication that the battery gauge is out of calibration.

Once the keyboard controller 160 has determined that the value stored in the battery capacity register 162 is out of calibration, the keyboard controller preferably notifies operating system software, e.g., bezel button software, such that this software can notify the computer system user. Keyboard controller 160 preferably notifies host system software of the calibration error by sending a scan code over the secondary expansion bus. Scan codes are generated by the keyboard controller 160 anytime a user presses keys on the keyboard of a computer. These scan codes uniquely identify the key pressed and pass this information up via the secondary expansion bus to the operating system software. In much the same way that the keyboard controller notifies the operating system software that a particular key was pressed, a unique scan code which identifies the calibration error of the battery gauge can be generated and sent to the system software over the secondary expansion bus. The system software, by monitoring the scan code stream coming from the keyboard controller 160, can detect the presence of the unique scan code indicating the battery gauge is out of calibration and take necessary steps to notify the computer system user that a battery calibration should be done.

Numerous variations and modifications will become apparent to those skilled in the art once the above disclosure is fully appreciated. For example, other computer system components could perform the steps in the decision tree to determine whether the battery gauge is out of calibration. The battery logic itself may be modified to perform the necessary determinations. Likewise, operating system software could be modified to perform the tasks described. Also, there may be other steps that could be performed to make the determination of whether the battery gauge is in calibration, and these steps would still be within the spirit of this invention. The keyboard controller may calculate and use its own battery voltage value, or may use the battery voltage value stored in registers in the battery logic. The registers containing parameters of the battery have been disclosed to be housed in specific hardware; however, these registers may be located in other locations, for instance all in the keyboard controller, and still be within the contemplation of this invention. It is intended that the following claims be interpreted to embrace all such variations and modifications.

We claim:

1. A laptop computer, comprising:
   a CPU;
   a primary expansion bus;
   a first bridge logic coupling said CPU to said primary expansion bus;
   a secondary expansion bus;
   a second bridge logic coupling said secondary expansion bus to said primary expansion bus;

a system battery having an actual battery capacity;

a battery logic associated with said system battery, said battery logic having a battery gauge register adapted to hold a value representing a calculated battery capacity; and a keyboard controller coupled to said secondary expansion bus and further coupled to said battery logic, said keyboard controller adapted to determine whether said calculated battery capacity held in the battery gauge register is out of calibration with the actual battery a capacity.

2. The laptop computer as defined in claim 1 further comprising:

said battery logic having a cell temperature register adapted to hold a value representing existing battery temperature; and said keyboard controller having a battery voltage register adapted to hold a value representing existing battery voltage, and wherein said keyboard controller further adapted to determine whether said calculated battery capacity held in the battery gauge register is calibrated with the actual battery capacity by analyzing the battery gauge register when said system battery reaches a valid charge termination, said keyboard controller determines said valid charge termination by analyzing the battery voltage register value and the cell temperature register value during a system battery charge cycle.

3. The laptop computer as defined in claim 2 wherein said keyboard controller determine an elapsed time after said battery gauge register value reaches a maximum battery charge indication after said system battery reaches the valid charge termination, said keyboard controller further adapted to initiate an indication to a user if the elapsed time required is longer than a predetermined time.

4. The laptop computer as defined in claim 3 wherein said predetermined time is ten minutes.

5. The laptop computer as defined in claim 2 wherein said keyboard controller is adapted to read the calculated battery capacity held in the battery gauge register when said system battery reaches a valid charge termination, said keyboard controller further adapted to initiate an indication to a user if the battery gauge value is less than a predetermined value when said system battery reaches a valid charge termination.

6. The laptop computer as defined in claim 5 wherein said predetermined value is ninety percent of a full charge capacity.

7. The laptop computer as defined in claim 1 further comprising:

said keyboard controller having a low battery signal register that the keyboard controller asserts just prior to the system battery becoming incapable of supplying power to said laptop computer; and said keyboard controller is further adapted to determine whether said calculated battery capacity held in the battery gauge register is calibrated with the actual battery capacity by analyzing the calculated battery capacity held in the battery gauge register when said battery logic asserts the low battery signal.

8. The laptop computer as defined in claim 7 wherein said keyboard controller is further adapted to determine an elapsed time after said battery gauge register value reaches a minimum battery charge indication that said keyboard controller asserts the low battery signal, said keyboard controller adapted to initiate an indication to a user if the elapsed time is longer than a predetermined time.

9. The laptop computer as defined in claim 8 wherein said predetermined time is ten minutes.

10. The laptop computer as defined in claim 7 wherein said keyboard controller adapted to read the battery gauge register when said keyboard controller asserts the low battery signal and said keyboard controller adapted to initiate an indication to a user if said calculated battery capacity held in the battery gauge register is greater than a predetermined value when said low battery signal is asserted.

11. The laptop computer as defined in claim 10 wherein said predetermined value is ten percent of full charge capacity.

12. The laptop computer as defined in claim 1 wherein said keyboard controller is adapted to send a unique scan code to said operating system upon determining said calculated battery capacity held in the battery gauge register is out of calibration, said operating system then informs a user that the calculated battery capacity held in the battery gauge register needs calibration with the actual battery capacity.

13. A keyboard controller unit for a computer system that monitors a battery capacity register, a battery voltage register, a cell temperature register and a low battery signal register, the controller comprising:

an expansion bus communication logic adapted to allow communication over a secondary expansion bus;

a battery device communication logic adapted to allow communication between said keyboard controller and a battery logic associated with the system battery; and said keyboard controller adapted to periodically read the battery capacity register using said battery device communication logic and determine whether said battery capacity register corresponds to an actual battery capacity.

14. The keyboard controller unit of claim 13 wherein said keyboard controller is adapted to monitor the battery capacity register during a charge cycle of the system battery and to determine whether said battery capacity register corresponds to an actual battery capacity by analyzing the contents of the battery capacity register when a valid charge termination occurs, said keyboard controller determines whether said system battery reaches the said valid charge termination by analyzing the battery voltage register value and the cell temperature register value during a system battery charge cycle.

15. The keyboard controller unit of claim 13 wherein said keyboard controller is adapted to monitor the battery capacity register during a discharge cycle of the system battery and determine whether said battery capacity register corresponds to an actual battery capacity by analyzing the contents of the battery capacity register when a low battery signal is asserted by the battery logic.

16. The keyboard controller unit of claim 13 wherein said keyboard controller adapted generate a scan code that uniquely identifies that said battery capacity register is out of calibration and communicate that scan code over said secondary expansion bus to operating system software.

17. A method of operating a computer system comprising:

calculating a battery capacity value of a system battery;

determining whether said calculated battery capacity value is calibrated to closely match an actual system battery capacity.

18. The method as defined in claim 17 wherein determining whether said calculated battery capacity value is calibrated further comprises:

reading a battery voltage and a cell temperature;

calculating whether the system battery has had a valid charge termination based on said battery voltage and cell temperature; and analyzing the calculated battery capacity value when the valid charge termination occurs to determining whether said battery capacity value is calibrated to closely match the actual system battery capacity.

19. The method as defined in claim 18 wherein analyzing the calculated battery capacity further comprises:

timing how long after said calculated battery capacity reaches a full battery capacity indication that said valid charge termination occurs; and sending an indication that said calculated battery capacity value is out of calibration if the calculated battery capacity value reaches a full battery capacity indication more than a predetermined time before a valid charge termination occurs.

20. The method as described in claim 19 wherein the predetermined time is approximately ten minutes.

21. The method as defined in claim 18 wherein analyzing the calculated battery capacity further comprises:

reading said calculated battery capacity when the valid charge termination occurs; and sending an indication that said calculated battery capacity value is out of calibration if the calculated battery capacity value indicates a predetermined value when said valid charge termination occurs.

22. The method as defined in claim 21 wherein the predetermined value is less than approximately ninety percent of a full scale reading.

23. The method as defined in claim 18 wherein analyzing the calculated battery capacity further comprises:

asserting a low battery signal when said system battery nears depletion of its stored energy;

timing how long after the assertion of the low battery signal said calculated battery capacity reaches a depleted battery capacity indication; and sending an indication that said calculated battery capacity value is out of calibration if the calculated battery capacity value reaches a depleted battery capacity indication more than a predetermined time before the assertion of the low battery signal.

24. The method as described in claim 23 wherein said predetermined time is approximately ten minutes.

25. The method as defined in claim 18 wherein analyzing the calculated battery capacity further comprises:

asserting a low battery signal when said system battery nears depletion of its stored energy;

reading said calculated battery capacity upon the assertion of the low battery signal; and sending an indication that said calculated battery capacity value is out of calibration if the calculated battery capacity value indicates a predetermined value more than approximately ten percent of a full scale reading when said low battery signal becomes asserted.

26. The method as described in claim 25 wherein said predetermined value is more than approximately ten percent of a full scale reading.

27. The method as defined in claim 17 further comprising:

correcting small errors in the calculated battery capacity value by setting the calculated battery capacity value to 100% upon a valid charge termination.

28. The method as defined in claim 17 further comprising:

correcting small errors in the calculated battery capacity value by setting the calculated battery capacity value to 0% upon assertion of a low battery indication.

* * * * *